July 13, 1965　　　　P. J. GILL　　　　3,194,105
THREADED FASTENER WITH TENSION INDICATING MEANS
Filed May 16, 1961　　　　　　　　　　　　　2 Sheets-Sheet 1

INVENTOR
PETER JOHN GILL
By
Kurt Kelman
AGENT

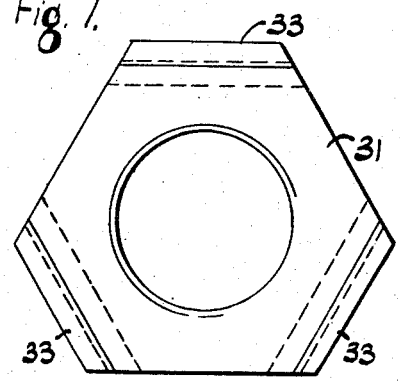
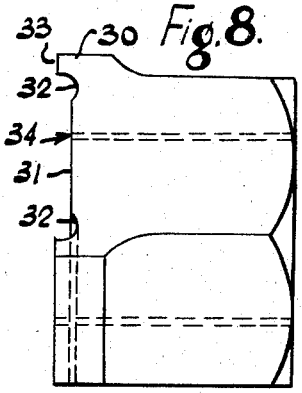
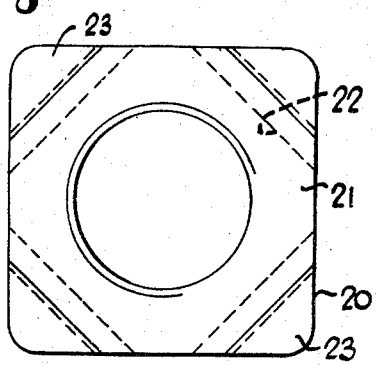
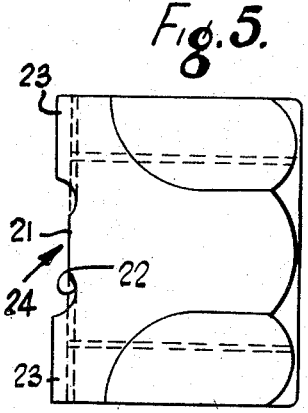
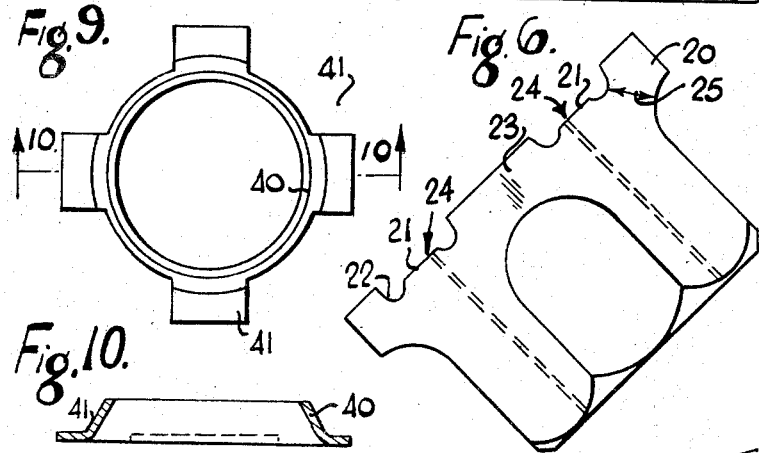
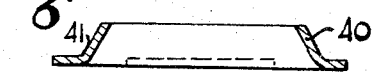

United States Patent Office 3,194,105
Patented July 13, 1965

3,194,105
THREADED FASTENER WITH TENSION
INDICATING MEANS
Peter J. Gill, Codsall, England, assignor to G.K.N. Group Services Limited, Smethwick, England, a British company
Filed May 16, 1961, Ser. No. 110,589
Claims priority, application Great Britain, May 26, 1960, 18,598/60
5 Claims. (Cl. 85—62)

This invention relates to bolted connections for holding two or more members together and is particularly, though not exclusively, concerned with high strength bolted connections which are being used in increasing numbers today to replace riveted connections in structural work (e.g. bridges and like large steel structures).

It has been recognised for some time that to achieve optimum efficiency with bolted connections, the bolts should be tightened to such an extent that a specified minimum tension is induced in the bolt shank and the reasons for this are well known to engineers using bolted connections and are of great importance to erectors using high strength bolts in structural steel work.

Certain proposals for achieving desired tension in the bolt shank have been based upon a measurement or visual indication of the tightening torque, either by using torque indicating wrenches or by using an element of the connection (i.e. nut, bolt, or washer) to give a visual indication of when a certain torque has been achieved. The drawback to this method which is based upon a knowledge of the applied torque, is that the relationship between torque and tension in the bolt shank can vary very considerably between one bolt and another; one factor which can cause the variation is frictional resistance between nut and bolt threads, between nut and washer or abutment and between bolt head and washer or abutment, which cannot be relied upon to be constant for any two connections.

Also when using impact wrenches which are widely used today, the magnitude of the applied torque can vary due to fluctuations in air pressure and times of application.

Other proposals have been based upon a measurement of the extension of the bolt during tightening, but these involve relatively expensive instruments which sometimes cannot be used, because the ends of the bolt cannot be made accessible to the instrument.

It is an object of the present invention to provide an improved bolted connected which will provide a reliable visual indication of when a certain minimum tension has been achieved in the bolt shank. In the following statement I refer to "elements" of a bolted connection and by these I mean the bolt and the nut and the one or more washers if such are present.

According to the invention I provide a bolted connection wherein one of the elements of the connection is so shaped and of such dimensions that when under load created as a result of tension being induced in the bolt shank by virtue of the tightening of the nut and bolt, the whole or a part of the element will be deformed plastically in such a manner as to provide a positive visual indication that a certain minimum load has been applied corresponding to a specified minimum tension in the bolt shank.

For example, one of the elements may be so shaped and dimensioned that when first assembled with the other elements and just prior to inducing tension in the bolt, there is left a definite gap between part of this element and an abutment (which may be one of the members being connected together or may be one of the other elements of the connection) and such that when the connection is tightened and tension is induced in the bolt shank, this specially shaped element will deform plastically and will cause the gap to reduce in size until, if tightening is continued far enough, the gap may be closed completely.

It is emphasized here that the deformation which takes place involves plastic flow of the metal in the cold, and this is a feature which distinguishes the invention from a previously used form of deformable washer which was in the form of a crinkle washer and simply became flattened out under a nut or under the head of a bolt. Whilst this previous method was a visual indication, it only involved simple bending (or straightening to be more exact) and this took place under relatively low load, far too low for the sort of tensile loads which are required in modern high strength bolted connections. Also, with the present invention, as explained hereinafter, considerable deformation takes place at substantially constant load, which was not so with this prior washer.

The bolt or the nut or a washer of a bolted connection may be chosen as the indicating element in accordance with the present invention.

The invention is illustrated in the drawings accompanying this specification in which:

FIGURE 4 is a plan view from above of one form of nut.

FIGURE 5 is a side elevation on FIGURE 4.

FIGURE 6 is an elevation in the direction of the arrow in FIGURE 4.

FIGURE 7 is a plan view from above of another form of nut.

FIGURE 8 is a side elevation on FIGURE 7.

FIGURE 9 and FIGURE 10 are plan and sectional elevation views respectively of a type of indicator washer which may be used in the present invention.

Figure 1:
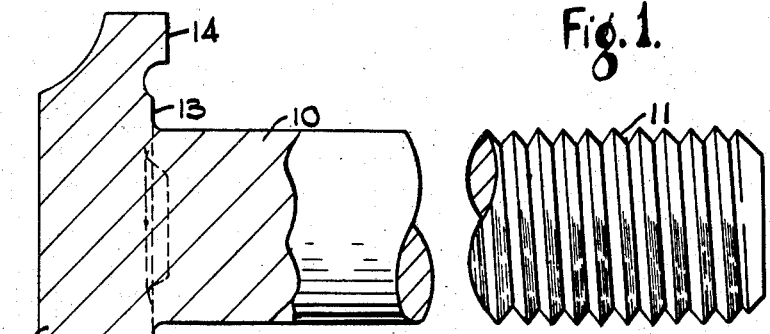
FIGURE 1 is a part sectional side elevation of a bolt.
Figure 2:
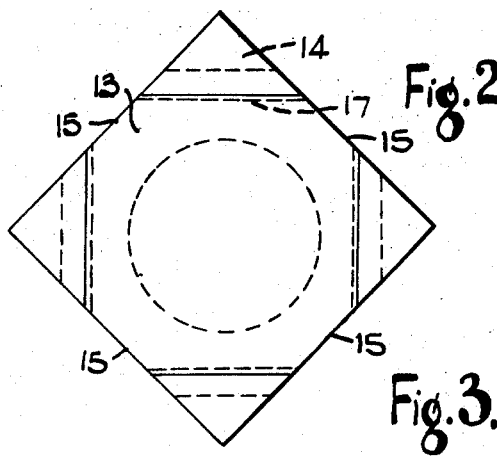
FIGURE 2 is an end view looking from the left in FIGURE 1.

The bolt shown in FIGURES 1 and 2 is of generally the same proportions as a conventional bolt and has a shank 10 provided with an externally screw-threaded portion 11 and a head 12 which is here shown as being of square form, but could also be of more conventional hexagonal form or any other desired shape.

The underside of the head 12 is relieved over an area 13 surrounding the shank 10 and the recess formed by this relief is as shown in FIGURE 2 of octagonal form and arranged so that it provides on the underside of the head four triangular-shaped feet 14 and a gap 15 disposed centrally along each side face of the head. This gap 15 can be seen in the diagrammatic sketches in FIGURE 3.

Further the width of the section indicated at 16 is reduced by cutting off the corners of the head on its upper face to form the inwardly concave parts 18, and also grooves 17 are formed in the relieved portion 13, each groove being along one of the longer sides of the octagonal recess. The surfaces of the parts 18 and the surfaces of the grooves 17 are generated by straight lines parallel to each other and tangential to respective circles centered on the bolt axis.

When the bolt is under load and tension is being induced in the shank 10 by virtue of the tightening of the nut and bolt, the feet 14 will be bearing against an abutment either in the form of a washer under the head 12 or perhaps in the form of one of the members which is being secured by the bolt and increase in the load will produce cold flowing of the metal of the head 12 in the region of the cross-sections indicated at 16 in FIGURE 1, due to bending and shear. This will result in gradual closing of the gap 15 and when the portion 13 begins to contact the abutment the presence of the grooves 17 facilitates a definite "bedding down" of the metal of the head.

Figure 3:
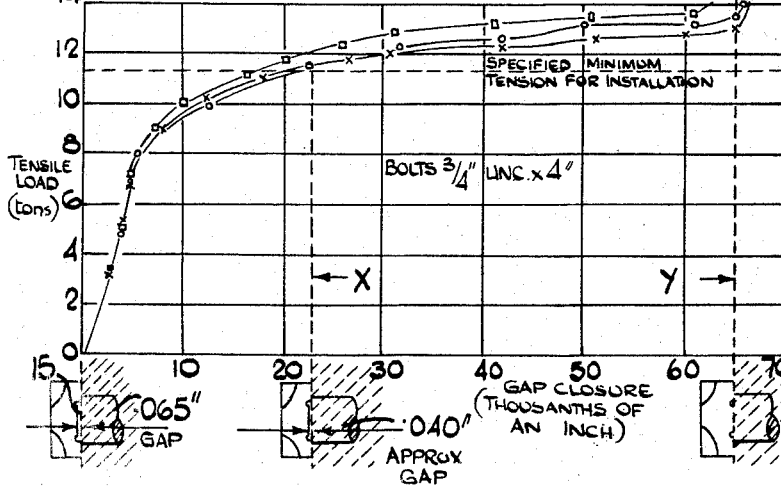
FIGURE 3 is a graph and diagram showing the behaviour of the bolt as load is applied.

As shown in FIGURE 3, if tightening of the bolt is continued for a sufficient time, the gap 15 will become completely closed when the metal which has flowed into the gap comes up against the abutment.

The graph in FIGURE 3 shows the behaviour of three similar bolts which were tested under load and it will be observed that there is a phase extending between ordinates X and Y where the gap 15 closes under substantially constant load. The ordinate X corresponds to the position where there has been induced in the bolt shank a specified minimum tension and it will be seen that from the position X to the position Y, the tensile load in the bolt shank is above this specified minimum tension and, therefore, any position in between these two limits would be satisfactory from the point of view of having ensured at least the minimum tension being induced in the bolt shank. This feature whereby a considerable amount of deformation of the head takes place at substantially constant load, means that there is a good degree of latitude available and this greatly facilitates the act of inspecting these bolts after tightening to see whether they have been correctly tightened, because a tightened bolt which falls anywhere within the limits X and Y will be satisfactory.

The graph shows the behaviour of a ¾″ U.N.C. x 4″ bolt from which it will be observed that the desired minimum tension in such a bolt is in the region of 12 tons and in actual practice will probably be about 12.67 tons. When tightening down is first commenced at zero tension the width of the gaps 15 is .065″ and when the desired minimum tension is reached the gap has closed to approximately .040″; anywhere between this state and complete closure of the gap will be satisfactory.

For a ⅞″ and 1″ bolt, the desired minimum tension is approximately 16 tons and 21 tons respectively and in each case the design of the head will be such that the dimension of the gap 15, when this desired minimum tension is reached, is approximately .040″ as with the ¾″ bolt.

The above figures, and other figures quoted herein, are the results of tests so far carried out and are given as an approximate guide to the sort of characteristics which would be expected from the bolts and nuts referred to but these figures are not to be regarded as exact figures or limiting upon the scope of the invention.

The optimum gap has, so far, been determined by trial but it is thought that for practical purposes this gap should be dimensioned during manufacture so that, after the desired minimum tension has been reached there will be approximately .040″ of gap left so as to allow this amount of plastic movement to take place if tightening is continued beyond this point. It is thought that the amount of movement or gap closure which takes place before plastic flow occurs is roughly the same for all sizes of bolt.

The above conditions also apply to the nuts described hereinafter.

Referring now to FIGURES 4 to 8 of the drawings accompanying the complete specification there are shown two forms of nut made in accordance with the invention and in the first one (FIGURES 4 to 6) the base 20 of the nut is of square form and is provided on its underside, in the same way as the bolt previously described, with a relieved octagonal recess 21, four grooves 22 across the four corners which provide four triangular feet 23, and, on each side of the base, a gap 24. Also, at each corner the section of the nut is relieved at 25 to obtain the correct value of indicated load.

The gaps 24 are utilised in the same way as the gaps 15 of the bolt to indicate when the desired minimum tension has been achieved in any ordinary form of high tensile bolt with which this nut is used.

A slightly different form of nut is shown in FIGURES 7 and 8. In this case the base 30 of the nut is of hexagonal form and on its underside has the recess 31 of hexagonal form and three grooves 32 which provide three feet 33 each of trapezoidal shape and three gaps 34 on three sides of the nut. The gaps 34 provide the visual indication of tension in the bolt shank as with the previous construction.

Tests so far made have shown that for such nuts the optimum gap (24 or 34) is also approximately .040″ and this indicates that the desired minimum tension has been reached in the bolt with which the nut is being used.

If it is thought desirable a sealing washer or some form of sealing compound may be used under the head of a bolt or nut of the invention. Owing to the presence of a gap it may be desired to provide some means for preventing moisture from reaching the hole through which the bolt passes where it might give rise to corrosion of the plates or like members which are secured by the particular bolted connection.

If sealing is required the thickness of the sealing member, compound or the like may be chosen so that it is at least equal to the dimension of the gap (under the head of the bolt or nut) which corresponds to the desired minimum tension in the bolt shank. This will ensure that when the connection is tightened the sealing member or compound will be compressed and thus the desired seal effected. A deformable plastic washer may be used or any form of sealing compound which is compressible so that it will flow and seal off any opening through which moisture might reach the hole through which the bolt passes.

If a washer is to be used as the element which provides the load indication the washer may be in a form similar to the nut shown in FIGURES 4 to 6 but with a plain central hole instead of a tapped hole.

With a bolted connection in accordance with the present invention, a specified minimum tension can be ensured without relying on any relationship between tightening torque and tension in the bolt shank and in fact without needing to know the magnitude of the tightening torque. Also the desired tension can be achieved without any yielding of the bolt shank and the bolt can be tightened by conventional means without needing any special equipment or instruments.

Inspection of the bolted connection is a simple matter such as with the aid of feeler gauges or other simple measuring devices, or alternatively, by eye, and also there is a visual indication provided during tightening.

However, if inspection in this manner should be difficult due to surrounding circumstances, such as when an operator is working in a dangerous position (e.g. high up on a bridge) a more outstanding visual indication may be provided with the use of the indicator washer shown in FIGURES 9 and 10.

This comprises a ring 40 having a frusto-conical form and provided with four projecting tabs 41; these tabs could be brightly coloured. Such washer may be fitted in the recessed portion under the head of the bolt or nut with the tabs locating in the four gaps (15, 24). When the gaps close the conical ring 40 will be flattened causing the tabs 41 to project out through the gaps and provide a pronounced visual indication that the required minimum tension has been achieved.

What I claim then is:

1. A steel bolt, for use in a high strength bolted connection, having a shank with a head at one end and having on the underneath face of the head, which face is in engagement with a flat abutment in the connection, first and second radially extending flat surfaces which are spaced apart axially, said second surface comprising a polygonal recess surrounding the shank and concentric with the axis of the bolt and said first surface comprising a number of projections outside the area of said recess and angularly spaced apart around the axis of the bolt so as to provide gaps between adjacent projections visible on the sides of the head, when same is in engagement with the abutment, the underneath face of the head having a groove adjacent each projection, between the projection and the said second surface, each groove being concave in cross-section and generated by straight lines tangential to a circle centred on the bolt axis, the cross-sections of the head, in planes containing the bolt axis, between said first surface and the upper surface of the bolt head, and between said second surface and the upper surface of the bolt head being solid and devoid of any interruption, the exterior of the head, adjacent each groove having an inwardly concave surface, generated by straight lines tangential to a circle centred on the bolt axis, said straight lines which generate a concave surface and the groove adjacent thereto being parallel to each other, thereby forming a reduced cross-section of the bolt head between each groove and its adjacent inwardly concave surface, and the axial distance between said first and second surfaces being sufficient to permit plastic deformation at the reduced cross-section between each said groove and its adjacent inwardly concave surface on the exterior of the bolt head.

2. A steel bolt according to claim 1 having a head of square shape and four of the said projections on the underneath face of the head, one at each corner.

3. A steel nut for use in a high strength bolted connection, having on the underneath face of the nut, which face is in engagement with a flat abutment in the connection, first and second radially extending flat surfaces which are spaced apart axially, said second surface comprising a polygonal recess surrounding the central hole in the nut and concentric with the axis of the nut and said first surface comprising a number of projections outside the area of said recess and angularly spaced apart around the axis of the nut so as to provide gaps between adjacent projections visible on the sides of the nut, when same is in engagement with the abutment, the underneath face of the nut having a groove adjacent each projection, between the projection and the said second surface, each groove being concave in cross-section and generated by straight lines tangential to a circle centred on the nut axis, the cross-sections of the nut, in the planes containing the nut axis, between said first surface and the upper surface of the nut, and between said second surface and the upper surface of the nut being solid and devoid of any interruption, the exterior of the nut, adjacent each groove having an inwardly concave surface, generated by straight lines tangential to a circle centred on the nut axis, said straight lines which generate a concave surface and the groove adjacent thereto being parallel to each other, thereby forming a reduced cross-section of the nut between each groove and its adjacent inwardly concave surface and the axial distance between said first and second surfaces being sufficient to permit plastic deformation at the reduced cross-section between each said groove and its adjacent inwardly concave surface on the exterior of the nut.

4. A steel nut according to claim 3 having a base of square shape and four of the said projections on the underneath face of the nut, one at each corner.

5. A steel nut according to claim 3, having a base of hexagonal form and three of the said projections on the underneath face of the nut, one along each of three alternate sides.

References Cited by the Examiner

UNITED STATES PATENTS

| 2,278,062 | 3/42 | De Koharovich | 151—38 |
| 2,543,705 | 2/51 | Place | 151—38 |
| 2,570,863 | 10/51 | Rowe | 85—62 |
| 2,781,687 | 2/57 | Knocke | 85—62 |

FOREIGN PATENTS

| 586,689 | 11/59 | Canada. |
| 1,057,395 | 5/59 | Germany. |
| 948 | 1/13 | Great Britain. |
| 870,946 | 6/61 | Great Britain. |

EDWARD C. ALLEN, *Primary Examiner.*

CARL W. TOMLIN, *Examiner.*